April 3, 1951  N. FLESCH  2,547,860
BRAKE BEAM GUIDE
Filed Feb. 8, 1949  4 Sheets-Sheet 3
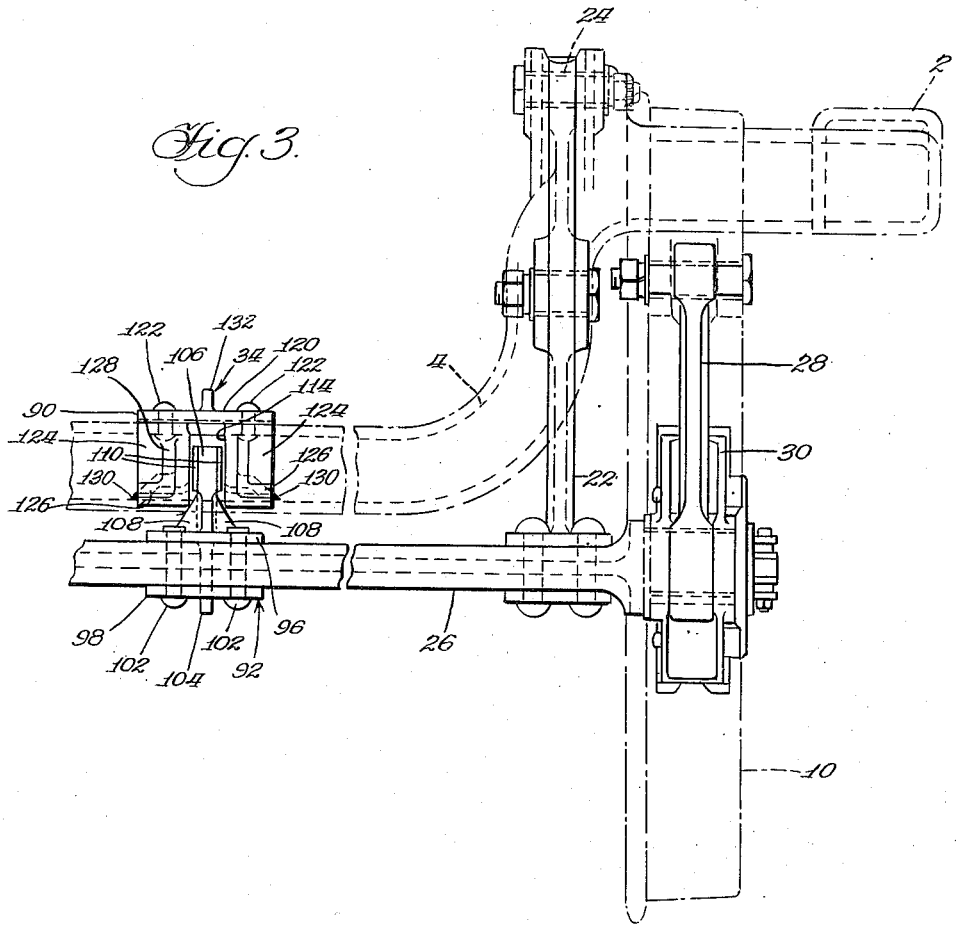
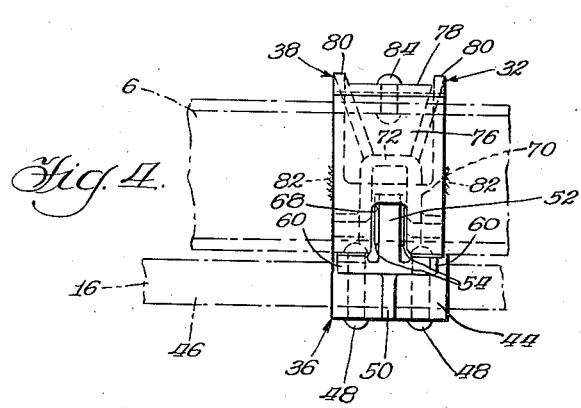
INVENTOR.
Norman Flesch
BY
Atty.

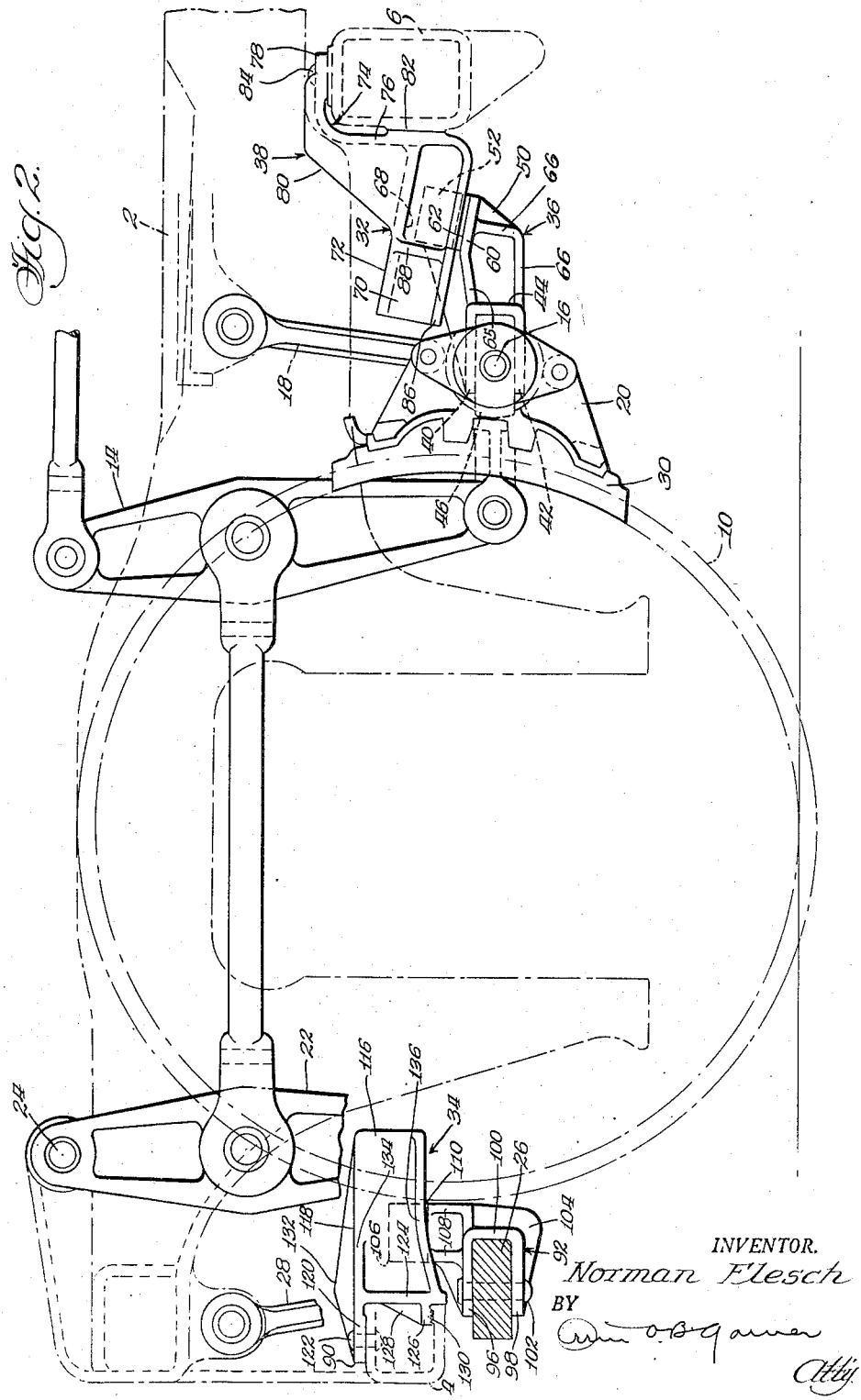

April 3, 1951     N. FLESCH     2,547,860
BRAKE BEAM GUIDE
Filed Feb. 8, 1949     4 Sheets-Sheet 4
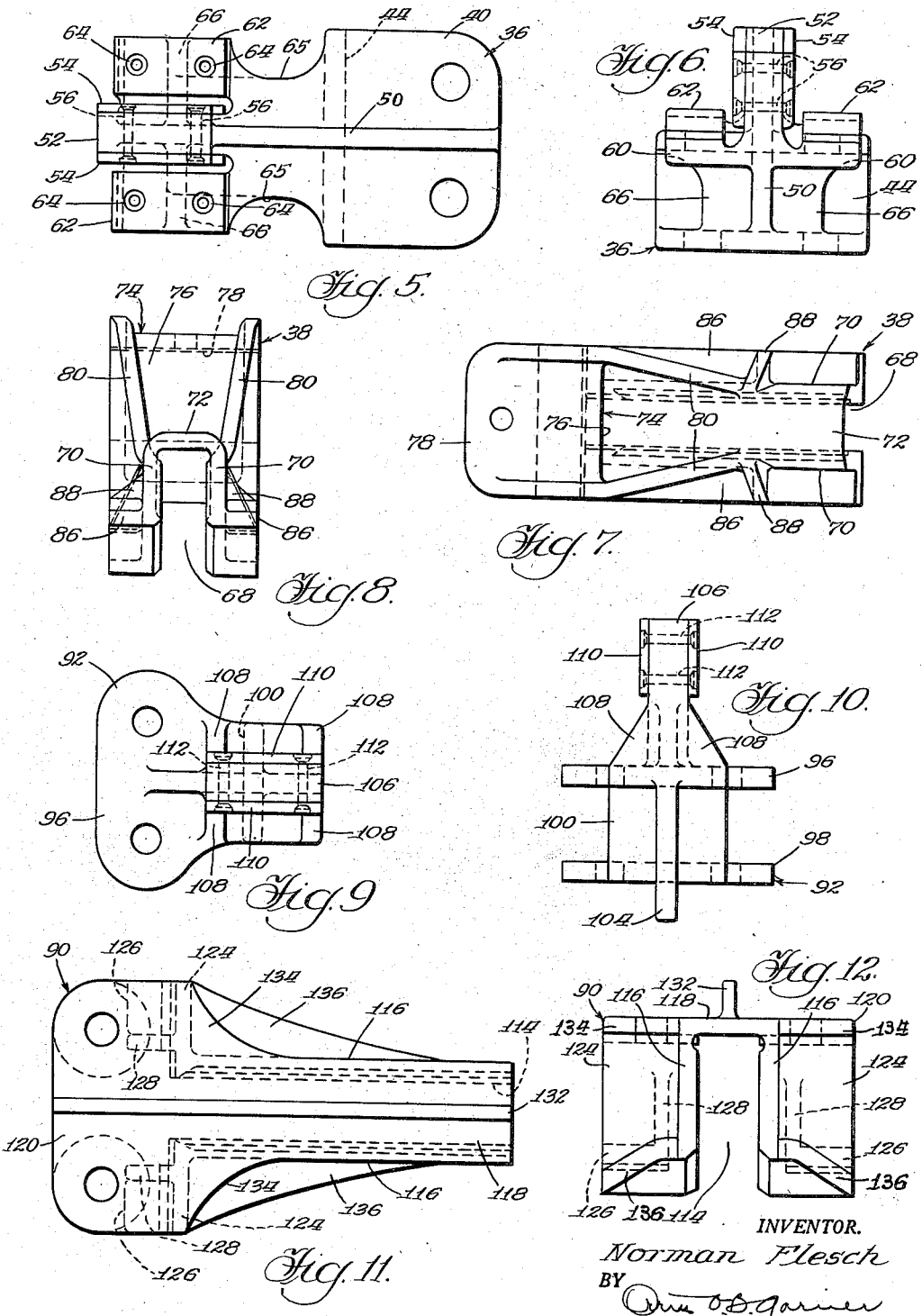
INVENTOR.
Norman Flesch
BY
Atty

UNITED STATES PATENT OFFICE 2,547,860

BRAKE BEAM GUIDE

Norman Flesch, Chicago, Ill., assignor to American Steel Foundries, Chicago, Ill., a corporation of New Jersey Application February 8, 1949, Serial No. 75,103

10 Claims. (Cl. 188—207)

This invention relates to brake equipment of the hanger-suspended beam type and more particularly to novel means for restraining swinging movements of the rigging.

Recent tests have shown that various parts of the brake rigging are subjected to severe stresses as a result of violent free swinging of the brake rigging which is induced by the motion of the associated car truck operating at high speeds. This condition is at least in part responsible for failure of various parts of the brake rigging, especially the brake hangers.

The general object of the invention is to provide means for controlling swinging movements of the brake rigging.

A more specific object of the invention is to provide a guide tongue on each brake beam and a guide bracket mounted on the truck frame and having a slot receiving the tongue therein, said slot and tongue being formed and arranged to accommodate movement of the beam from release to applied position and vice versa and being effective to limit movement of the brake beam laterally of the truck, whereby similar movement of the other parts of the brake rigging connected to the beam is effectively restrained.

A further object of the invention is to provide guide means on the beam and on the truck frame which, in addition to controlling the oscillations of the beam, are also effective to restrain rotation of the beam and thus serve to balance the beam.

Another object of the invention is to provide simple, inexpensive guide means which may be incorporated in brake rigging presently in use.

These and other objects of the invention will be apparent from the specification and the drawings, wherein:

Figure 2 is a side elevational view of Figure 1 with portions of the frame and brake rigging at the left side broken away and shown in section to more clearly illustrate the invention;

Figure 3 is an end view taken from the left of Figures 1 and 2;

Figure 4 is a fragmentary view taken substantially on the line 4—4 of Figure 1;

Figure 1:
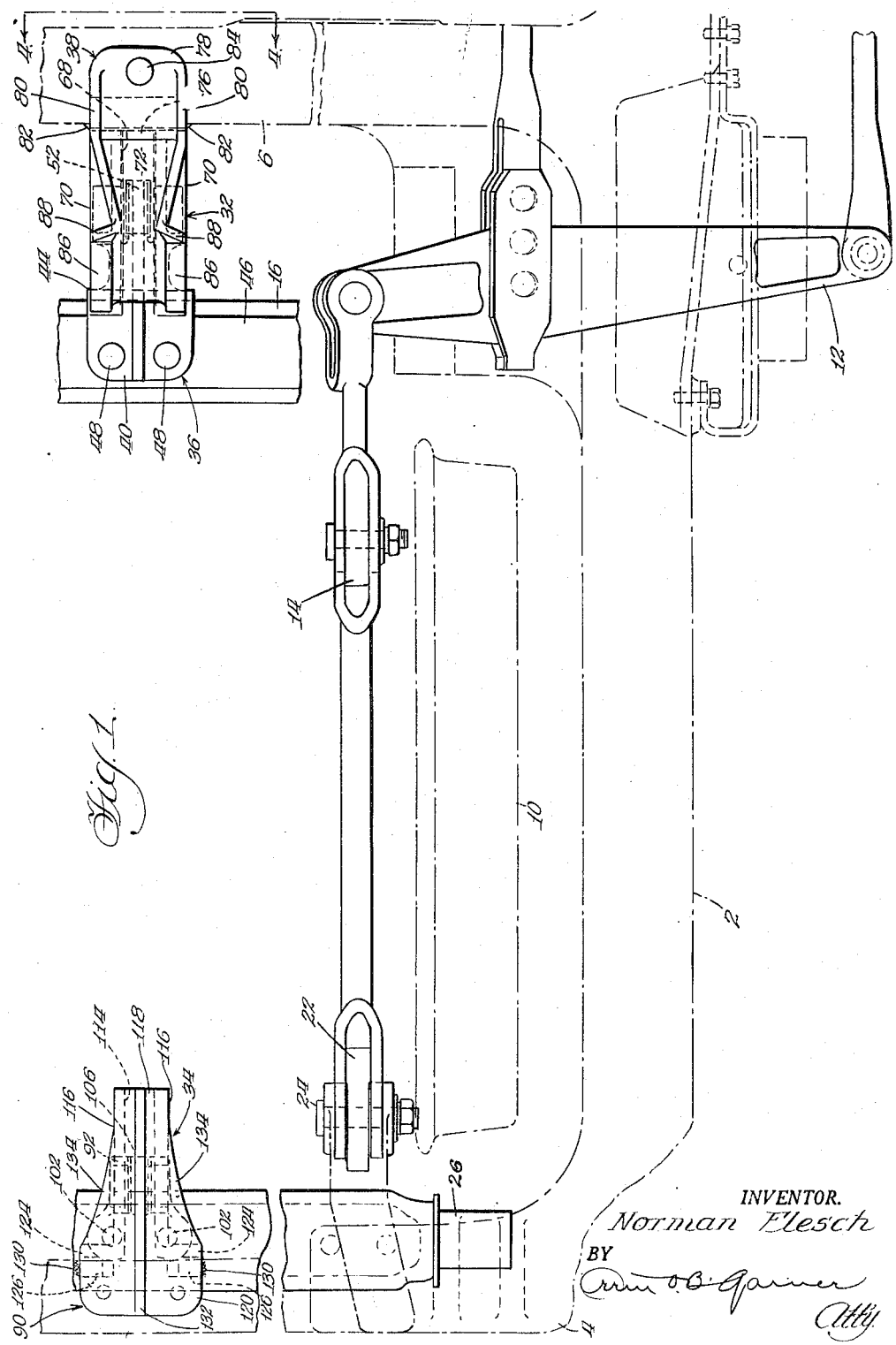
Figure 1 is a fragmentary top plan view of a railway car truck, showing the invention applied to conventional beam type brake rigging.

Figures 5 to 8, inclusive, illustrate various parts of the guide assembly shown in the right half of Figures 1 and 2. Figure 5 is a top plan view of the friction tongue, and Figure 6 an end view taken from the left of Figure 5; Figure 7 is a top plan view of the guide bracket, and Figure 8 a front view thereof taken from the right of Figure 7;

Figures 9 to 12, inclusive, illustrate the parts of the guide assembly shown at the left side of Figures 1 and 2. Figure 9 is a top plan view of the guide tongue, and Figure 10 an end view thereof taken from the right of Figure 9; Figure 11 is a top plan view of the guide bracket, and Figure 12 an end view thereof taken from the right of Figure 11.

Describing the invention in detail and referring first to Figures 1 to 4, inclusive, the car truck is of conventional design and includes a side rail 2 at each side thereof, an end rail 4 at each end thereof and a transom 6 at each side of the transverse center line of the truck. The side rails and end rails and transoms are integrally joined to form a unitary structure as seen in Figure 1. The truck comprises a wheel and axle assembly 10 at each end thereof journaled to the frame in the usual manner.

The truck is provided with conventional clasp brakes of the general type shown and described in greater detail in Patent No. 2,277,662, issued to Walter H. Baselt by the United States Patent Office on April 20, 1937, and as seen in Figures 1 and 2, comprises a cylinder lever 12 which is operatively connected to a vertical live truck lever 14 which, in turn, is operatively connected to the brake beam 16 pivotally suspended from the truck frame by a hanger 18. The brake beam carries a brake head or friction assembly 20 for engagement with the periphery of the adjacent wheel. The lever 14 is connected to a dead truck lever 22 which is pivoted at its upper end as at 24 to the truck frame and which at its lower end is operatively connected to the brake beam 26, said beam 26 being suspended from the truck frame by the lever 22 and a hanger 28 and carrying a brake head and shoe assembly 30 (Figure 3) for engagement with the periphery of the adjacent wheel. It will be understood that the brake rigging at opposite sides of the truck is interconnected by the brake beams extending transversely of the truck and that the beams are similarly suspended at the opposite ends thereof. It will be noted that the brake rigging, which includes the before-mentioned parts, is pivotally suspended from the truck frame and, as the points of pivot wear, the rigging is normally free to pivot and to swing laterally. Lateral swinging of the brake rigging, which when brought to sudden stops at each end of its swing, induces bending stresses in the hangers and the truck levers. This constant bending effect progressively fatigues the material, resulting in ultimate failure of the hangers and the levers generally through the body portions thereof.

In order to correct this condition, combination guide and control assemblies, generally indicated 32 and 34, are provided at approximately the longitudinal center line of the truck as shown at the right and left sides, respectively, of Figures 1 and 2.

The assembly 32, parts of which are shown in Figures 5 to 8, inclusive, includes a tongue member 36 and a cooperating guide member 38, the tongue member being connected to the brake beam 16 and the guide member being connected to the adjacent transom 6, as hereinafter more fully explained.

The tongue member 36 comprises a U-shaped jaw portion at one end, said jaw portion including top and bottom webs 40 and 42 and an intermediate web 44 forming the inner end of the jaw. The jaw receives the bar portion 46 (Figure 2) of the brake beam 16 and is connected thereto by rivets 48 (Figure 1). The tongue member also comprises a portion extending from the rear of the jaw, said portion including a generally vertical web 50 merging with the rear side of wall 44 and the upper surface of the top web 40. The web 50 terminates at its extremity remote from the jaw portion in a thicker generally rectangular tongue portion 52, the tongue portion 52 being faced with nonmetallic pads 54, 54, such as brake lining, secured to portion 52 by spaced rivets 56, 56. The web 50 is provided at the lower end of the tongue portion 52 with laterally extending ledges 60, 60 which on their top sides are faced with nonmetallic pads 62, such as brake lining, secured to the respective ledges by rivets 64. The web 50 is reinforced by gussets 65, 65 extending from opposite sides thereof between the rear side of the jaw wall 40 and the adjacent margins of the ledges 60, 60 and merging therewith. The ledges 60, 60 are reinforced by outstanding flanges 66, 66 at opposite sides of web 50. The flanges 66 merge at their upper ends with the undersides of the respective ledges and extend to the lower edge of web 50 and follow the lower edge of the web 50 and merge with the lower end of the rear side of the jaw wall 40 of the guide tongue.

The tongue portion 52 is received within a generally vertical slot 68 defined between the spaced generally vertical side webs 70, 70 of the guide braket 38. Webs 70, 70 are interconnected at their upper edges by a transverse web 72 and are connected to a mounting portion, generally designated 74. The mounting portion 74 comprises a generally vertical mounting plate or wall 76 connected at its lower end to the inner ends of webs 70 and 72 and at its upper end terminating in a securing lug 78 extending substantially at right angles thereto. The connection between the webs 70 and 72 and the wall 76 is reinforced by spaced upstanding gussets 80, 80 which merge with the top surface of lug 78, the external side of plate 76 and the webs 70 and 72. The mounting plate 76 is seated against a side of the associated transom 6 and is secured thereto in any convenient manner as by welding at 82, 82. The securing lug 78 overlaps the top of the transom and is secured by a rivet 84 to the transom. The lower edges of the webs 70, 70 are provided with outturned flanges 86, 86, these flanges being reinforced intermediate their ends by laterally extending gussets 88, 88 on the remote sides of the webs 70, 70, the gussets 88 merging at their lower edges with the top sides of the respective flanges. It will be observed that the bottom sides of the flanges 86 as well as the ledges 60, 60 on the guide tongue are inclined rearwardly downwardly toward the transom 6 in order to accommodate movement of the brake rigging to and from the wheels. The flanges 86, 86 are adapted to abut against the pads 62, 62 in the release position of the rigging thus serving as balancing means to prevent rotation of the brake beam 16 under the weight of the truck lever 14, as may be seen at the right of Figure 2 and also control vertical movement of the associated portion of the rigging. Lateral movement of the brake beam is controlled by the pads 54, 54 on the tongue portion 52 of the tongue member engaging the adjacent sides of the webs 70, 70. The assembly 32 thus serves not only to control lateral and vertical oscillations of the brake beam 16 and the parts connected thereto but to balance the beam by limiting rotation of the beam 16 to prevent the friction assembly 20 from dragging on the wheel in the release position of the rigging.

Referring now to the left side of Figures 1 and 2 and to Figures 9 to 12, it will be noted that the assembly 34 is in general similar to assembly 32 and comprises a guide bracket 90, which is secured to the adjacent end rail 4, and a guide tongue 92 secured to the brake beam 26.

The tongue 92 comprises a jaw portion at one side of its lower end, said jaw portion including top and bottom webs 96 and 98 receiving a bar portion of the brake beam 26 therebetween. The jaw also comprises a web 100 defining the inner end of the jaw and interconnecting the top and bottom webs thereof and abutting against the adjacent lateral edge of the bar portion of beam 26. The jaw portion is secured to the beam 26 by rivets 102, as best seen in Figures 2 and 3. Externally of the jaw portion, the tongue member comprises a generally vertical web 104 which extends around webs 96, 98 and 100 and merges therewith and at its upper end is formed with a generally rectangular tongue portion 106. The web 104 is reinforced directly below the tongue portion 106 by spaced tapered gussets 108 extending outwardly from opposite sides of web 104 and merging with the external side of the jaw-portion top web 96 which extends to the lateral edge of web 104 remote from the jaw portion. The tongue portion 106 is provided at opposite sides thereof with nonmetallic pads 110, such as brake lining, the pads being secured to the tongue portion by spaced rivets 112. The tongue portion 106 operates within a generally vertical slot 114 defined between spaced generally vertical side webs 116, 116 of the guide bracket 90. The upper ends of the webs 116 are interconnected by a transverse web 118, which at one end extends beyond the webs 116 and is enlarged laterally to provide a securing lug 120 for the bracket 90. The lug 120 seats on the top web of the adjacent channel section end rail 4 and may be secured thereto in any convenient manner, as by rivets 122. The ends of the webs 116 adjacent lug 120 are provided with outturned flanges 124 to afford a seat for the bracket against the adjacent edges of the webs of the end rail 4. The outturned flanges 124 are formed adjacent their lower ends with outwardly protruding extensions 126 which are reinforced by gussets 128 merging with the top surfaces of respective extensions 126 and the external sides of respective flanges 124. The extensions 126 are designed to seat on the top side of lower web of the end rail 4 and to be secured thereto as by welding at 130. The bracket 90 is reinforced at its top side by a generally vertical rib 132 which extends medially along the top of wall 118. The lateral sides of the bracket are reinforced by vertically spaced gussets 134 and 136 merging with the outer sides of the respective side walls 116 and the adjacent sides of the outturned flanges 124. The lower edges of the side walls and the gussets 136, 136 are slightly curved upwardly to provide clearance for gussets 108 to accommodate movement of the associated brake beam to and from the adjacent assembly.

I claim:
1. In a brake arrangement for a railway car truck comprising a frame, a wheel and axle assembly, a brake beam carrying brake means for engagement with the wheels of said assembly, means rotatably connected to the beam and pendulously suspending the beam from the frame, and means for limiting movements of the beam transversely of the truck comprising a substantially vertical tongue on the beam extending upwardly therefrom, a guide above the beam fixed to the frame and having a downwardly open slot elongated longitudinally of the beam and receiving said tongue therein, said tongue and beam being movable longitudinally of the truck toward and away from said assembly and said tongue being engageable with the sides of the slot to limit movement of the beam transversely of the truck, abutment means at opposite sides of the tongue, and abutment means on said guide above said first-mentioned abutment means and engageable therewith to limit rotation of the beam.

2. In a brake arrangement for a railway car truck, a frame, a supporting wheel and axle assembly therefor, brake means for said assembly, including a beam carrying friction means engageable with said assembly, means pivotally suspending said beam from said frame, means for controlling movements of said beam laterally of said truck and comprising a guide member on said frame, a tongue member on said beam extending into a slot in said guide member, non-metallic abutment means on said tongue engageable with the sides of said slot during said movement of said beam, flanges on said guide member, ledges on said tongue member, and non-metallic pads on said ledges engageable with said flanges in the released position of said brake means.

3. In a brake arrangement for a railway car truck, a frame, a wheel and axle assembly, brake means for said assembly, including a beam carrying friction means engageable with said assembly, support means for said beam pivotally connected to said frame, a rotatable connection between said beam and said support means, and means for controlling certain movements of said beam, comprising a guide member on said frame having a slot therein, a tongue member on said beam extending into the slot in said guide member and abuttable with the sides of said slot during said movements of the beam, and engageable abutment means on said members for limiting rotation of said beam.

4. In a brake arrangement for a truck comprising a frame member, a brake beam member rotatably carried by the frame member, and means for controlling certain movements of said beam member comprising a guide on one of said members having a slot therein, a tongue on the other of said members extending into said slot and abuttable with said guide during said movements of the beam member, and engageable abutment means on said tongue and guide for limiting rotation of the beam.

5. In a brake arrangement for a truck comprising a frame and a wheel and axle assembly, a beam pendulously suspended from the frame and carrying friction means for engagement with the wheels of said assembly, means for limiting lateral movement of said beam comprising a member connected to the beam intermediate its ends, and a member connected to the frame, one of said members having a slot extending lengthwise transversely of the beam and receiving a portion of the other member therein, and engageable abutment means on said members for limiting movement of said beam away from said assembly, the abutment means on said one member sloping away from the abutment means on the other member toward said assembly.

6. In a device of the class described, a guide member comprising spaced side webs defining a guide slot therebetween, a wall interconnecting said side webs and at one end extending therebeyond to provide a securing lug for said member, outturned flanges on said webs at said ends connected at their upper extremities to said lug, and gussets connecting adjacent sides of said flanges and said webs.

7. In a brake arrangement for a railway car truck, a frame, a supporting wheel and axle assembly, including brake beams pendulously suspended at opposite sides of said assembly, means for controlling movement of each beam laterally of the truck comprising cooperating elements connected to the frame and to the beam respectively, said elements being arranged to abut against each other upon lateral movement of said beam, and abutment means on cooperating elements engageable to limit movement of the associated beam away from said assembly, the abutment means on one of said elements sloping away from the abutment means on the other of said elements toward said assembly to accommodate pendulous movement of the associated beam toward the assembly.

8. In a brake arrangement for a railway car truck, a frame, a supporting wheel and axle assembly therefor, brake means for said assembly including a brake beam pendulously suspended from the frame, and means for controlling movements of said beam laterally of the truck comprising abuttably arranged elements on said beam and said frame, said elements including abutment means engageable to limit movement of the beam away from the assembly along faces disposed in a plane intersecting the arc of pendulous movement of the beam toward and away from said assembly.

9. In a device of the class described, a guide member comprising spaced side webs and an intervening top wall defining a guide slot, a mounting plate connected to said webs, a securing lug extending from said plate, and gussets additionally interconnecting said lug with said wall and said wall with said webs.

10. A brake beam guide member comprising spaced side walls and a connecting wall joining said side walls along one of their longitudinal edges and defining a guide slot therewith, mounting means at one end of said member connected to said walls, abutment means on the edges of said side walls remote from said connecting wall and sloping from said one end of said member toward said connecting wall.

NORMAN FLESCH.

REFERENCES CITED

The following references are of record in the file of this patent:

UNITED STATES PATENTS

| Number | Name | Date |
|---|---|---|
| 165,487 | Garth et al. | July 13, 1875 |
| 1,662,916 | Busse | Mar. 20, 1928 |
| 1,784,917 | Walker | Dec. 16, 1930 |
| 1,841,515 | Anderson | Jan. 19, 1932 |
| 2,199,128 | Crossman | Apr. 30, 1940 |

FOREIGN PATENTS

| Number | Country | Date |
|---|---|---|
| 213,943 | Great Britain | Apr. 7, 1924 |